Sept. 29. 1925.　　　　　　1,555,415
E. C. HEAD
GEAR HOBBING MACHINE
Filed Sept. 12, 1923　　4 Sheets-Sheet 1

INVENTOR.
Ernest C. Head
Harold E. Stonebraker,
his ATTORNEY

Sept. 29, 1925.

E. C. HEAD

GEAR HOBBING MACHINE

Filed Sept. 12, 1923     4 Sheets-Sheet 2

1,555,415

INVENTOR.
Ernest C. Head
Harold E. Stonebraker
his ATTORNEY

Sept. 29, 1925.  
E. C. HEAD  
GEAR HOBBING MACHINE  
Filed Sept. 12, 1923  
1,555,415  
4 Sheets-Sheet 3
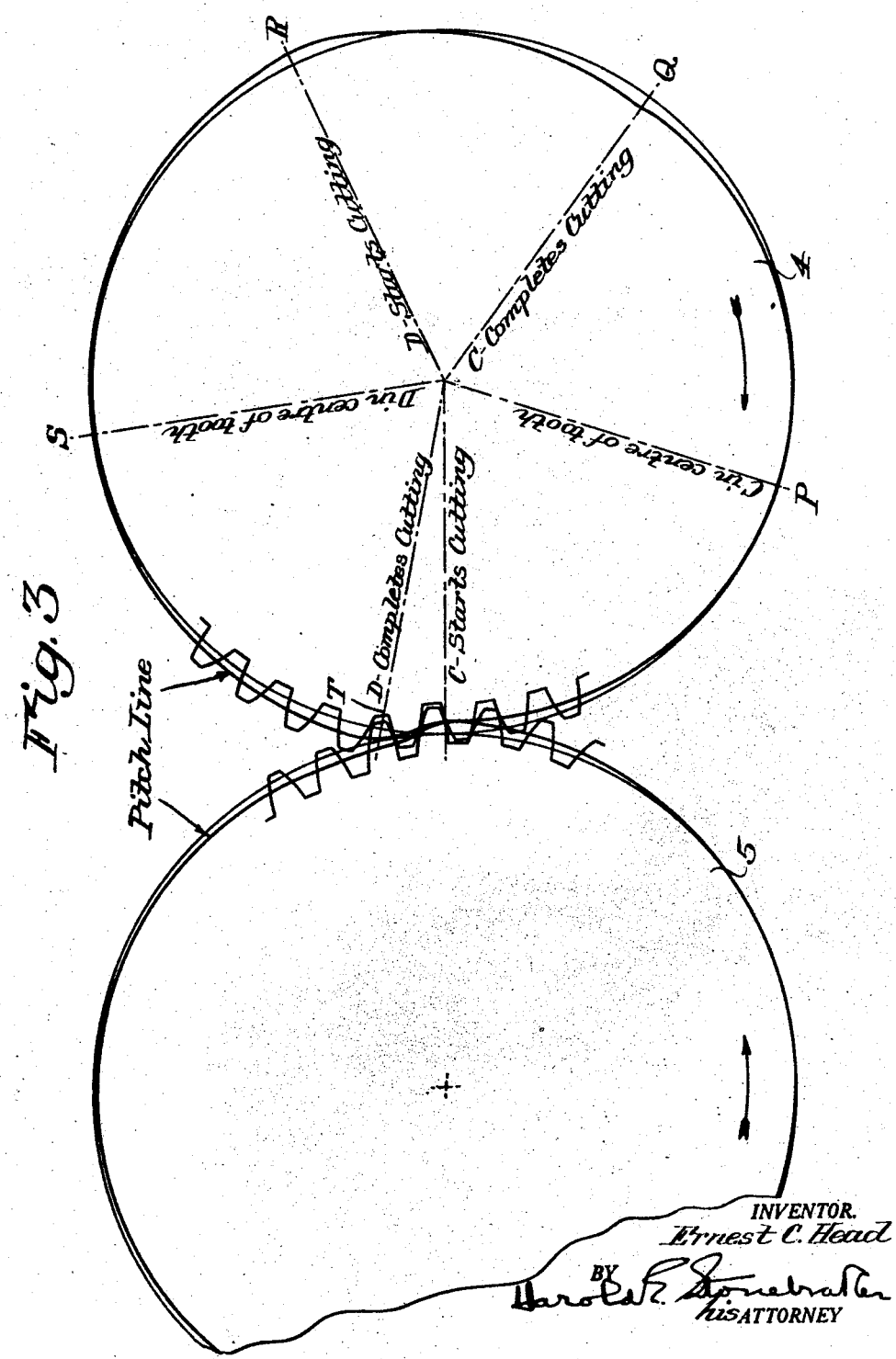

Sept. 29, 1925.  
E. C. HEAD  
GEAR HOBBING MACHINE  
Filed Sept. 12, 1923  
1,555,415  
4 Sheets-Sheet 4

INVENTOR.  
Ernest C. Head  
BY Harold E. Stonebraker  
his ATTORNEY

Patented Sept. 29, 1925.

1,555,415

UNITED STATES PATENT OFFICE.

ERNEST C. HEAD, OF ROCHESTER, NEW YORK, ASSIGNOR TO GLEASON WORKS, OF ROCHESTER, NEW YORK, A CORPORATION OF NEW YORK.

GEAR-HOBBING MACHINE.

Application filed September 12, 1923. Serial No. 662,272.

*To all whom it may concern:*

Be it known that I, ERNEST C. HEAD, a citizen of the United States of America, residing at Rochester, in the county of Monroe and State of New York, have invented certain new and useful Improvements in Gear-Hobbing Machines, of which the following is a specification.

My invention relates to a gear hobbing machine, and has for its purpose to afford mechanism permitting the use of rotary milling cutters in forming both members of a pair of gears, and making a correction in one or both of the gears to compensate for the path of travel of the cutters, so as to produce a pair of gears with teeth of proper shape for accurate intermeshing relationship.

More particularly, the invention is intended for the production of spiral or curved tooth bevel gears by a hobbing process, employing rotary edge mill cutters, for cutting both members of a pair, and obtaining the desired form of tooth by varying the relative speed of travel between a cutter and a continuously rotating blank, as each tool travels through a tooth space.

To these and other ends, the invention comprises the construction that will appear clearly from the following description, when read in conjunction with the accompanying drawings, the novel features being pointed out in the claims following the description.

In the drawings:

Figure 3 is a diagrammatic view of the gears employed to vary the speed of the cutter;

While the invention is susceptible of different possible adaptations, for purposes of convenient illustration I have shown it applied to a mechanism of the general type disclosed in Patent No. 1,349,951, dated August 17, 1920, which involves a machine for hobbing curved tooth or spiral bevel gears with a rotary face mill cutter.

In the patented structure, the gear blank is continuously rotated about its axis and the cutter is similarly rotated, so as to cause successive tools to engage and cut different teeth on the blank, thus producing a lengthwise curved tooth. The necessary generating motion, for imparting an involute profile to the sides of the teeth, is secured by mounting the cutter on an oscillatory cradle which, as it is rocked back and forth, causes the cutter to be moved bodily past the gear blank corresponding to the relative rolling motion between a crown gear and segment. The rotation of the gear blank and the relative rolling or generating motion between the gear blank and cutter for the present invention may be the same as that disclosed in said prior patent, or of any other known type, so that detailed disclosure of these parts of the mechanism is unnecessary.

The principal difference of the present structure is that instead of using a face milling cutter, I employ an edge milling cutter, with a series of tools extending radially and outwardly from the cutter head. Since each tool travels in a concave path over the bottom of a tooth space, it produces a tooth of slightly irregular formation from end to end, and in order to correct for this, and produce a tooth of proper shape, I impart a relative change of speed between the cutter and blank, as each tool travels across the face of the blank from end to end of a tooth. This is preferably done by varying the speed of the cutter, although it may be accomplished by varying the speed of the blank, and where the speed of the cutter is the changeable factor, each tool travels faster at the ends of each tooth and slower at the center, or slower at the ends and faster at the center, depending on whether it is cutting the concave or convex side of the tooth, the tool being retarded or accelerated as it moves from the center to the end of the tooth. One arrangement by which this motion may be accomplished will now be described.

Figure 1:
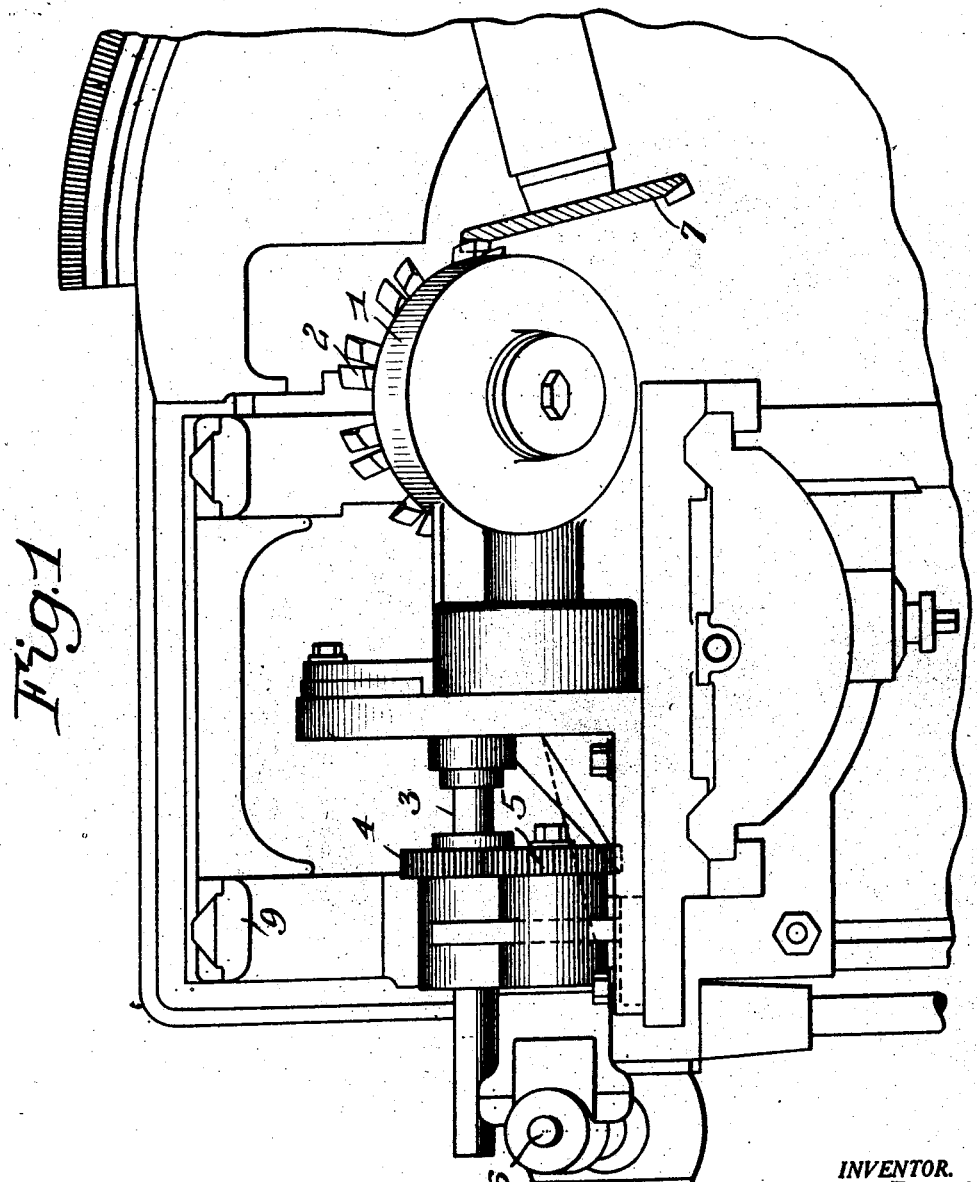
Figure 1 is a plan view of a machine equipped with one practical embodiment of my invention.
Figure 2:
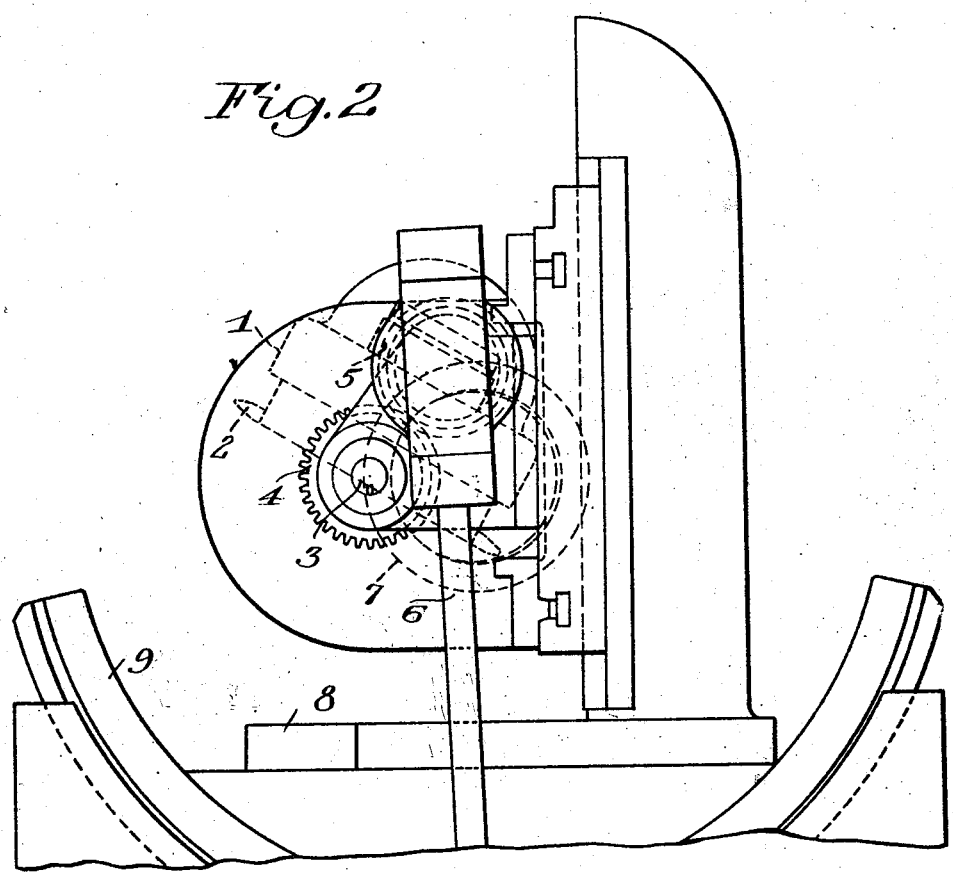
Figure 2 is an end view.

1 designates a cutter provided with a series of tools 2 arranged radially and extending outwardly from the cutter head, the latter being rotated through suitable gearing from a shaft 3. The shaft 3 carries a gear 4 which is engaged and driven by the gear 5, which latter is operated from the main power shaft 6 that is driven in any suitable manner. 7 designates the gear blank which is positioned with reference to the cutter, as illustrated in Figures 1 and 2, during the cutting operation, and is rotated by gearing, as disclosed in said prior patent. The cutter and driving mechanism therefor are mounted on a bed 8 that is oscillated in curved guides 9, to impart the required generating roll to the cutter, with reference to the blank, during the cutting operation to produce an involute profile.

Owing to the tools travelling in a circular path, that is concave over the bottom of a tooth space, and the cutting edges being arranged at an angle to their plane of movement, as usual in gear generation, the thickness of a tooth varies from end to end, and correction is necessary to make a tooth conform to the shape that it would have if the tool travelled in a straight path across the bottom of the space, instead of in a concave path.

Since the cutter and blank are rotating continuously, any variation in their relative speeds causes a change in the shape of the tooth, and I am able to correct for the difference referred to by changing the relative speed between each tool and the gear blank, as the tool is moving from one end of the tooth to the other. Such variation in the relative speed of the cutter and blank is preferably obtained by rotating the blank at a fixed speed and varying the rate of travel of the cutter. Various means of accomplishing this are possible, and one efficient mechanism for the purpose consists in making the gears 4 and 5, which drive the cutter, elliptical or cam gears designed so as to make one complete revolution each time a tool or pair of tools travels through a tooth space, the necessary changes in speed of the tool being effected by the irregular formation of the gears 4 and 5, which are designed with a varying pitch circle to produce the required changes of speed.

With this arrangement, gears 4 and 5 would make as many rotations, for each rotation of the cutter, as there are pairs of tools on the cutter. The tools may be arranged so as to cut on opposite faces of a given tooth space, in which case each pair of tools would be slightly spaced laterally, or all the tools may cut in a single plane, one tool cutting on a side of one tooth and the next tool cutting on the opposite side of a succeeding tooth, as will appear more fully presently.

Figure 4:
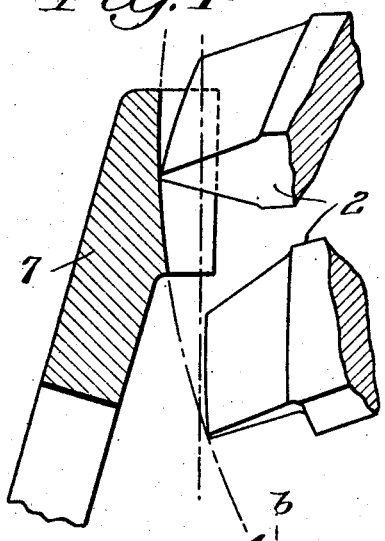
Figure 4 is a sectional view of a gear, showing the relative travel of a pair of tools.
Figure 5:
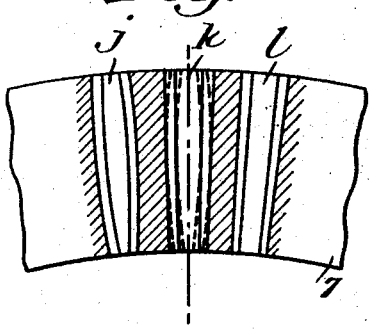
Figure 5 is a plan view of a portion of a straight tooth bevel gear, illustrating the shape of the tooth as produced by the cutter if no correction is made, and with the correction effected by my invention.

Figure 4 illustrates the travel of two tools through a tooth space, and Figure 5 shows the principle of the invention as applied to a straight toothed gear. With a circular edge mill of large diameter, so that each tool travels entirely across the face of the gear, as in Figure 4, the tooth space formed thereby is indicated at $j$, Figure 5, the tooth being thinner at the center and thicker at the ends. To correct this shape, the tooth must be cut away at the ends, as shown in full lines at $k$, Figure 5, the dotted lines showing the tooth before correction, while $l$ indicates the shape of the tooth space after correction.

Figure 6:
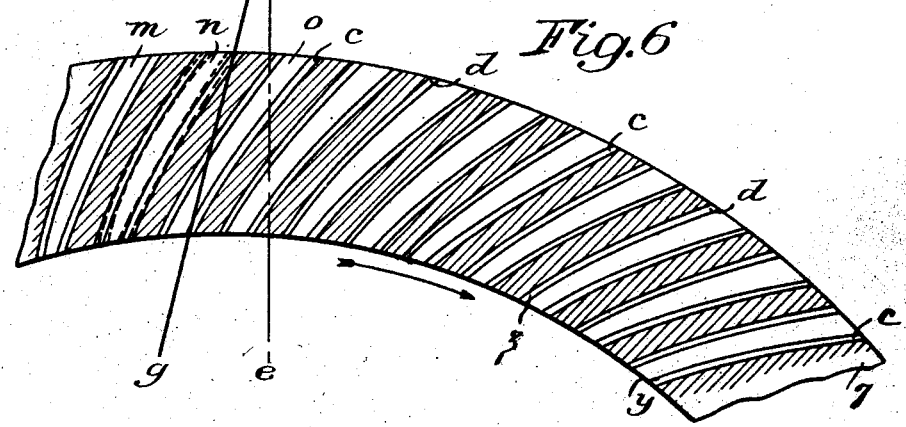
Figure 6 is a plan view of a portion of a spiral or curved tooth bevel gear.

Figure 6 shows a spiral or curved tooth bevel gear cut by continuously rotating a gear blank, and rotating in engagement therewith a circular edge milling cutter, with the cutting points of the different tools located in a single plane and passing in the direction of the line $e$, $b$, although the hob may be positioned so that the tools will travel in the plane $g$, $h$, or at any other desired angle.

$m$ indicates the shape of a tooth space cut with such a hob, without any correction of the tooth, corresponding to the space $j$ of Figure 5, while at $n$ the tooth space is shown in dotted lines, the full lines indicating the necessary correction to secure the proper form of tooth. $o$ shows the tooth space when corrected, by removing the excess metal between the dotted and full lines, shown at $n$, through varying the speed of the cutter, already described. If preferred, it is possible to cut one member of a pair of gears with teeth formed as indicated by the tooth space $m$ without correction, and make a correspondingly increased correction on the other member of the pair to compensate, or in other words, making the total correction on one member of the pair instead of dividing it between both.

Figure 8:
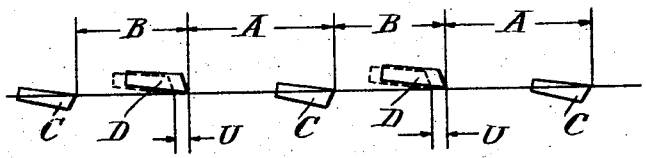
Figure 8 is a diagrammatic view showing the tool arrangement on the cutter, with the tools all cutting in one plane.
Figure 7:
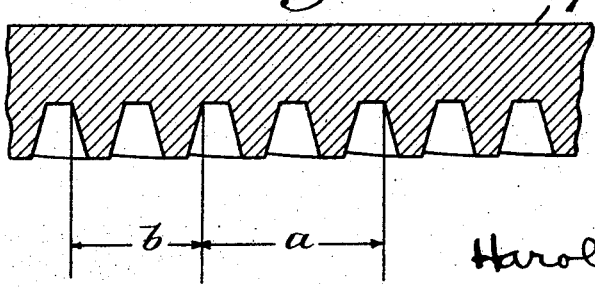
Figure 7 is a sectional view of the same.

The respective tools cut alternately on one side of a tooth and then on the other, and may cut every tooth or every second or third tooth as preferred. In the arrangement illustrated in Figures 6 and 8, tool C cuts at $c$ while tool D cuts at $d$. The tools are spaced in accordance with the proportions of the teeth, for instance, space A, Figure 8, is in the same proportion to space B, as $a$ is to $b$, Figure 7. This refers to the arrangement where the points of all the tools cut in the same plane as in Figure 8, and where the blades are spread laterally, as indicated by $x$, Figure 9, the successive tools cut on opposite faces of the same tooth space. Under this condition, the points of the blades do not cut in a single plane, and when one member of the pair is cut with the blades thus spread, it is necessary to cut the other member of the pair one face at a time, with all tools cutting in the same plane as in Figure 8, in order to match the first member of the pair.

The elliptical or irregular driving gears previously referred to cause each tool to be retarded or accelerated as it approaches the center of the tooth and to be correspondingly retarded or accelerated as it approaches the opposite end of the tooth, to cut away the metal between the dotted and full lines, as indicated at $n$, Figure 6. The two elliptical gears have the same number of teeth, and each makes one half a revolution as a tool passes through a tooth space.

Figure 9:
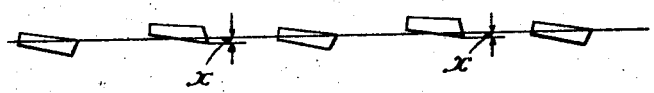
Figure 9 is a similar view with the tools spread apart, so that a pair of tools cut on opposite faces adjacent to one tooth space.

Referring to Figures 3 and 8, tool C starts to cut at point C of the elliptical driving gear, and is retarded in speed as the gear turns from C to P, at which time the tool is at the center of the tooth. The tool is then accelerated in speed from point P to Q of the gear, at which time the tool is at point $y$ of the tooth, see Figure 6. At this point, the gear will have moved through a greater arc than would a pair of equal diameter gears, so that the driving gear is accelerated at this point and the tool correspondingly so. The space between successive tools is represented by the distance from Q to R of the gear. When the point R of the gear is in driving engagement, there is still a certain amount of acceleration when tool D is ready to cut at $d$, and in order to make the necessary correction in the tooth, the speed of the tool must be retarded below normal. To accomplish this, the tool D is positioned, as shown in dotted lines in Figure 8, back of its normal position U. The distance from the normal position U of the tool to the position at which it is actually placed, as shown in dotted lines, is proportional to the increased speed of the elliptical gear at point R, plus the amount it is desired to retard the tool to bring it to correct cutting position. Figure 9 illustrates the arrangement where the tools are set an equal distance apart, and separated laterally a distance $x$, by varying which distance the tool is brought into proper cutting relation at point R.

Referring to Figures 3, 6 and 8, tool C cuts from $c$ to $y$ while the gear turns to Q, the speed of the tool being accelerated toward P and retarded between P and Q. Tool D cuts from $d$ to $z$ while the gear turns from R to T, the speed of the tool being increased from R to S and retarded from S to T. The tools move at normal speed at the centers of the teeth, or at points S and P with reference to the gear, and no correction is required at these points, but as the gear turns, it retards or accelerates the speed of the tool at the ends of the teeth, the tool moving faster at the ends of a tooth than at the center when cutting on a convex face, as $c$, and moving slower at the ends than at the center when cutting on a concave face, as $d$. The space from T to C of the gear represents the time required for the tools to pass from one tooth space to another.

The invention is equally applicable to bevel and spur gears, of spiral or curved tooth type, and while I have disclosed it with reference to a particular embodiment, it is not confined to the detailed arrangement set forth, and this application is intended to cover any changes or departures coming within the intent of my improvement, as set forth in the foregoing description, or the scope of the following claims.

I claim:

1. A gear hobbing machine comprising a rotary milling cutter having a plurality of tools for engagement successively with different teeth on a gear blank, means for rotating a gear blank continuously to present different teeth to successive tools on the cutter, and means for varying the relative speed of travel between the blank and cutter during the cutting of each tooth.

2. A gear hobbing machine comprising a rotary milling cutter having a plurality of tools adapted to successively engage different teeth on a gear blank, means for continuously rotating the blank to present different teeth to successive tools on the cutter, and means for varying the speed of the cutter during the travel of each tool through a tooth space.

3. A gear hobbing machine comprising a rotary edge mill cutter having a series of tools extending radially therefrom, means for rotating a gear blank continuously to present different teeth to successive tools on the cutter, and means for varying the relative speed of travel between the cutter and blank during the cutting of each tooth.

4. A gear hobbing machine comprising a rotary edge mill cutter having a series of tools extending radially therefrom, means for rotating a gear blank continuously to present different teeth to successive tools on the cutter, and means for varying the speed of the cutter during the travel of each tool through a tooth space.

5. A bevel gear hobbing machine comprising a rotary cutter having a series of tools for engagement successively with different teeth on a gear blank, means for rotating a gear blank continuously to present different teeth to successive tools on the cutter, and a pair of cam gears for driving the cutter at varying speeds so that each tool is operated at varying speeds as it travels through a tooth space.

In witness whereof, I have hereunto signed my name.

ERNEST C. HEAD.